(12) United States Patent
Bouvier et al.

(10) Patent No.: US 10,118,152 B2
(45) Date of Patent: Nov. 6, 2018

(54) ZEOLITE MATERIAL BASED ON MESOPOROUS ZEOLITE

(71) Applicant: ARKEMA FRANCE, Colombes (FR)

(72) Inventors: Ludivine Bouvier, Orthez (FR); Cecile Lutz, Gan (FR); Serge Nicolas, Lons (FR)

(73) Assignee: Arkema France, Colombes (FR)

( * ) Notice: Subject to any disclaimer, the term of this patent is extended or adjusted under 35 U.S.C. 154(b) by 45 days.

(21) Appl. No.: 14/914,220

(22) PCT Filed: Aug. 6, 2014

(86) PCT No.: PCT/FR2014/052055
§ 371 (c)(1),
(2) Date: Feb. 24, 2016

(87) PCT Pub. No.: WO2015/028741
PCT Pub. Date: Mar. 5, 2015

(65) Prior Publication Data
US 2016/0207024 A1      Jul. 21, 2016

(30) Foreign Application Priority Data
Sep. 2, 2013 (FR) .................................. 13 58358

(51) Int. Cl.
| | | |
|---|---|---|
| *B01J 20/18* | (2006.01) | |
| *B01J 29/04* | (2006.01) | |
| *C01B 39/02* | (2006.01) | |
| *C01B 39/24* | (2006.01) | |
| *B01J 29/08* | (2006.01) | |
| *B01J 35/00* | (2006.01) | |
| *B01J 35/02* | (2006.01) | |
| *B01J 35/10* | (2006.01) | |
| *B01J 37/00* | (2006.01) | |
| *B01J 20/30* | (2006.01) | |
| *B01J 20/28* | (2006.01) | |
| *B01J 20/12* | (2006.01) | |
| *B01J 37/06* | (2006.01) | |
| *B01J 37/08* | (2006.01) | |
| *B01J 29/00* | (2006.01) | |

(52) U.S. Cl.
CPC .............. *B01J 20/18* (2013.01); *B01J 20/12* (2013.01); *B01J 20/186* (2013.01); *B01J 20/28004* (2013.01); *B01J 20/28011* (2013.01); *B01J 20/28083* (2013.01); *B01J 20/3028* (2013.01); *B01J 20/3042* (2013.01); *B01J 20/3078* (2013.01); *B01J 20/3085* (2013.01); *B01J 29/041* (2013.01); *B01J 29/084* (2013.01); *B01J 35/002* (2013.01); *B01J 35/023* (2013.01); *B01J 35/026* (2013.01); *B01J 35/1038* (2013.01); *B01J 35/1057* (2013.01); *B01J 35/1061* (2013.01); *B01J 37/0009* (2013.01); *B01J 37/06* (2013.01); *B01J 37/08* (2013.01); *C01B 39/026* (2013.01); *C01B 39/24* (2013.01); *B01J 29/005* (2013.01); *B01J 35/0026* (2013.01); *B01J 2229/42* (2013.01)

(58) Field of Classification Search
CPC .... B01J 20/183; B01J 20/186; B01J 20/3042; B01J 20/2803; B01J 20/28083; B01J 20/28092; B01J 29/7019; B01J 29/7003; B01J 29/08; B01J 29/081; B01J 29/082; B01J 37/0063; B01J 2229/40; B01J 20/28004; B01J 20/2808; B01J 20/3028; B01J 20/3071; B01J 20/3078; B01J 29/041; B01J 37/0009; B01J 37/0018; B01J 37/08; B01J 35/023; B01J 35/1057; B01J 35/1061; B01J 2229/42
See application file for complete search history.

(56) References Cited

U.S. PATENT DOCUMENTS

| | | |
|---|---|---|
| 3,556,725 A | 1/1971 | Chiola |
| 5,654,061 A | 8/1997 | Visioli |
| 5,833,894 A | 11/1998 | Lanzani |
| 7,785,563 B2 | 8/2010 | Ryoo |
| 8,486,369 B2 | 7/2013 | Garcia-Martinez |
| 2002/0039610 A1 | 4/2002 | Furukawa |
| 2002/0106466 A1 | 8/2002 | Hausmann |
| 2012/0258852 A1 | 10/2012 | Martinez |

(Continued)

FOREIGN PATENT DOCUMENTS

| | | | |
|---|---|---|---|
| EP | 2592049 | 5/2013 | |
| JP | 2005143402 | 6/2005 | |
| WO | 2007043731 | 4/2007 | |
| WO | WO 2008152319 A2 * | 12/2008 | ............. B01D 53/02 |
| WO | 2012084276 | 6/2012 | |

OTHER PUBLICATIONS

Liu et al, "Synthesis and structural properties of hierarchically structured aluminosilcates with zeolite Y (FAU) frameworks", RSC Adv. (2013) pp. 15075-01584.*

(Continued)

*Primary Examiner* — David M Brunsman
(74) *Attorney, Agent, or Firm* — RatnerPrestia

(57) ABSTRACT

The present invention relates to zeolite materials in the form of agglomerates comprising at least one mesoporous Faujasite zeolite with an Si/Al ratio which is strictly greater than 1.4 and having both the characteristics of mesoporous zeolites, the properties associated with microporosity and the mechanical properties of zeolite agglomerates without mesoporous zeolite.

The invention also relates to the process for preparing the said zeolite materials in the form of agglomerates.

24 Claims, 1 Drawing Sheet

(56) References Cited

U.S. PATENT DOCUMENTS

2013/0183229 A1 7/2013 Garcia-Martinez
2013/0183231 A1 7/2013 Senderov

OTHER PUBLICATIONS

International Search Report for International Application No. PCT/US2013/059858 dated Dec. 9, 2013.
Written Opinion of the International Searching Authority for International Application No. PCT/US2013/059858 dated Dec. 9, 2013.
International Preliminary Report on Patentability for International Application No. PCT/US2013/059858 dated Mar. 31, 2015.
Kresge, et al. "Ordered mesoporous molecular sieves synthesized by a liquid-crystal template mechanism", Letters to Nature, vol. 359, Oct. 22, 1992, pp. 710-712.
Schwieger, W. et al., "Assemblies of mesoporous FAU-type zeolite nanosheets," Feb. 20, 2012, pp. 1962-1965, vol. 51(8), Angewandte Chemie International Edition.
Choi, M., et al., "Amphiphilic organosilane-directed synthesis of crystalline zeolite with tunable mesoporosity," Aug. 6, 2006, pp. 718-723, vol. 5, Nature Materials.
Xiao et al., "Zeolites with Hierarchically Porous Structure: Mesoporous Zeolites", Hierarchically Structured Porous Materials; From Nanoscience to Catalysis, Separation, Optics, Energy and Life Science, 2012 vol. 14, pp. 435-455.

\* cited by examiner

ZEOLITE MATERIAL BASED ON MESOPOROUS ZEOLITE

CROSS-REFERENCE TO RELATED APPLICATIONS

This is the national phase of International Application No. PCT/FR2014/052055, filed 6 Aug. 2014, which claims priority from French Application FR 1358358, filed 2 Sep. 2013. The disclosure of each of these applications is incorporated herein by reference in its entirety for all purposes.

FIELD OF THE INVENTION

The present invention relates to zeolite materials in the form of agglomerates comprising at least one mesoporous zeolite, and also to the process for preparing the said agglomerated zeolite materials.

BACKGROUND OF THE RELATED ART

Mesoporous zeolites are of great utility in many industrial fields, both as catalysts and catalyst supports, but also as adsorbents, in so far as their large porosity expressed in terms of the [surface area/volume] ratio allows the molecules with which they come into contact readily to access the core of the particles and to react on a large surface area, thus enhancing the catalytic and/or adsorbent properties of these materials.

The synthesis of inorganic mesoporous solids via a surfactant structuring effect was described for the first time in U.S. Pat. No. 3,556,725.

The Mobil company, in the 1990s, undertook extensive studies relating to mesoporous inorganic solids, especially relating to (alumino)silicic compounds, and more particularly the compound MCM 41 (for Mobil Composition Of Matter 41), for which a synthetic process is described in Nature, (1992), Vol. 359, pp. 710-712, which were the subject of numerous subsequent scientific patents and articles.

Such mesoporous materials are now well known at the laboratory scale, both as regards their pore structure and distribution and their modes of synthesis, and as regards the possible applications thereof as catalysts and/or as adsorbents.

These mesoporous inorganic materials have the major drawback of being thermally unstable in the presence of water, which greatly limits the industrial applications.

The search for mesoporous inorganic solids led to the development of mesoporous zeolites, also known as hierarchically porous zeolites (or else HPZ). They may be obtained by various processes, such as, for example, the one described in the article by Feng-Shou Xiao et al. (*Hierarchically Structured Porous Materials*, (2012), 435-455, Wiley-VCH Verlag GmbH & Co. KGaA: Weinheim, Germany 978-3-527-32788-1).

One of the routes envisaged is that of post-treatments using initially synthesized zeolite crystals, in powder form. These post-treatments are, for example, treatments with water vapour, followed by acidic and/or basic treatments which lead to dealumination, followed by additional treatments to remove extra-network species.

U.S. Pat. No. 8,486,369 and patent applications US 2013/0 183 229 and US 2013/0 183 231 are examples which illustrate such processes for preparing zeolite of mesoporous structure, in particular of Y type, by various treatments successive to vapour, and then with acids and in the presence of surfactant.

Patent WO 2012/084276 describes a process for preparing a mesoporous zeolite Y by various basic post-treatments, but to the detriment of the microporosity. These treatments furthermore result, as claimed, in an increase of the Si/Al ratio via dealumination. The zeolite Y powder thus treated is then shaped for use in a hydroconversion catalysis process.

Such processes have a tendency to create large pore volumes, but, in counterpart, greatly degrade the crystallinity of the initial zeolite powder, which is almost halved. It is moreover necessary to resort to additional cauterization treatments to stabilize the zeolite framework, to remove the extra-network aluminium atoms and thus to be able to perform subsequent heat treatments.

Such processes are therefore very cumbersome to implement due to the succession of numerous steps, which are sparingly economic and thus difficult to industrialize. In addition, the multitude of steps has a tendency to embrittle the zeolite structure and consequently reduce the intrinsic properties of these zeolites.

This is why syntheses of mesoporous zeolites directly and without post-treatment known in the prior art are nowadays preferred. Various publications show the feasibility of the laboratory synthesis of mesoporous zeolites, and, by way of example, patent applications WO 2007/043 731 and EP 2 592 049 are noted in particular, in which the synthesis of mesoporous zeolites is performed based on surfactant, and especially that of TPOAC type ([3-(trimethoxysilyl)propyl] octadecyldimethylammonium chloride).

Yet other publications illustrate such studies, for instance those of R. Ryoo (*Nature Materials*, (2006), Vol. 5, p. 718-723) which describe a synthesis of LTA with mesopores, or those of W. Schwieger (*Angew. Chem. Int. Ed.*, 51, (2012), 1962-1965) which describe the synthesis of mesoporous FAU (X) using TPHAC ([3-(trimethoxysilyl)propyl]hexadecyldimethylammonium chloride) as structuring agent.

However, there is not at the present time any description concerning the preparation of agglomerates based on mesoporous Y-type FAU zeolites (or hierarchically porous zeolite Y, otherwise known as "HPY"), in which agglomerates the specific properties of these mesoporous zeolites, in particular their microporosity, are conserved. As a result, the fact remains that at the present time not one industrial application, especially in the field of separation of liquids and/or gases, of ion exchange or in the field of catalysis, uses such zeolite agglomerates with high microporosity comprising at least one mesoporous Y-type FAU zeolite (known as "HPY").

It should be recalled that the industry, and especially the fields of application mentioned above, uses in the majority of cases zeolite agglomerates. In point of fact, synthetic zeolites are usually obtained after a process of nucleation and crystallization of silicoaluminate gels in which the size of the crystallites produced is from about a micrometer to several micrometers: they are then referred to as zeolite crystals in powder form.

These powders are not easy to use industrially since they are difficult to manipulate on account of their poor flowability, they generate substantial losses of pressure and poor distribution of the streams in the beds, especially in dynamic processes involving fluids in flow.

Thus, the agglomerated forms of these powders are preferred, which are more commonly referred to as zeolite agglomerates and which may be in the form of grains, strands, extrudates or other agglomerates, these said forms possibly being obtained by extrusion, pelletizing, atomization or other agglomeration techniques that are well known to those skilled in the art. These agglomerates do not have the drawbacks inherent in pulverulent materials.

These agglomerates generally consist of zeolite crystals and of a binder, which is usually inert with respect to the application for which the zeolite is intended, the said binder being intended to ensure the cohesion of the zeolite crystals and to give them the sufficient and necessary mechanical strength for the intended industrial application.

BRIEF SUMMARY OF THE INVENTION

One object of the present invention is thus to propose a zeolite material in agglomerated form comprising at least one mesoporous zeolite. As another object, the present invention proposes a zeolite material in agglomerated form comprising at least one mesoporous FAU zeolite, with an Si/Al atomic ratio which is strictly greater than 1.4 and which has improved crystallinity properties when compared with the materials of the prior art.

Yet another object consists in providing a process for preparing a zeolite material in agglomerated form comprising at least one mesoporous zeolite with an Si/Al atomic ratio which is strictly greater than 1.4, the said process being readily industrializable, and improved in terms of cost and duration, when compared with the processes for manufacturing agglomerates known in the prior art, while at the same time avoiding degradation of the properties of the mesoporous zeolite(s) present in the said material.

More particularly, one of the objects of the present invention consists in proposing an agglomerated zeolite material having the purity, crystallinity and pore distribution properties of the starting mesoporous zeolite(s) and moreover having good mechanical strength and optimized crystallinity, and thus in enabling easy and efficient industrial use, for example in the fields of catalysis (catalysts or catalyst supports), or in dynamic or static separation, adsorption or ion exchange processes.

Yet other objects will emerge in the light of the description of the present invention that follows.

DETAILED DESCRIPTION OF CERTAIN EMBODIMENTS OF THE INVENTION

Figure 1:
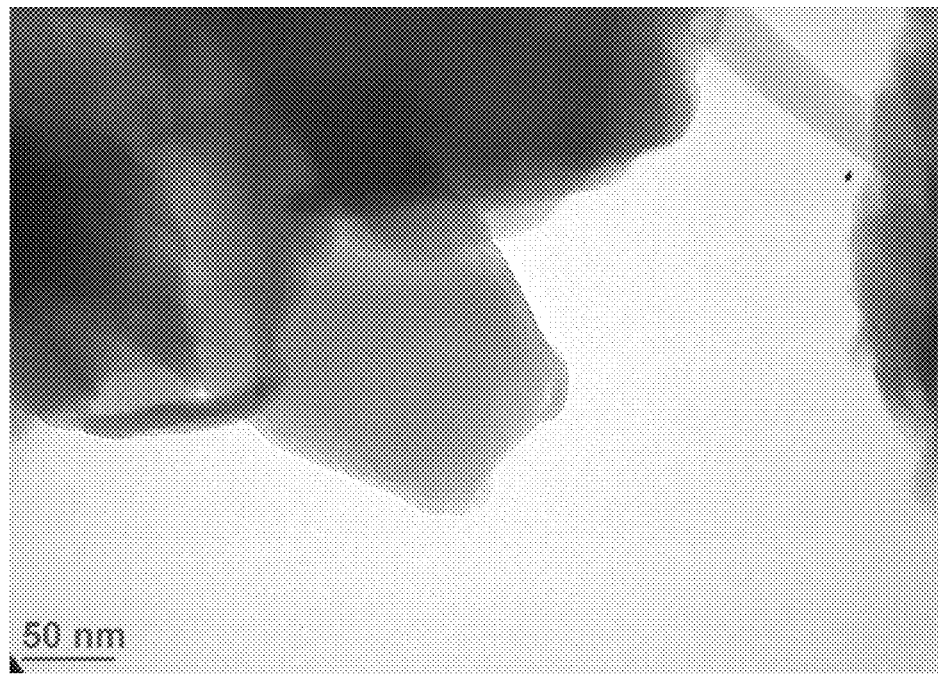
FIG. 1: TEM images obtained at a magnification of x 245 000 a reference adsorbent.

The Applicant has discovered that it is possible to totally or at least partially overcome the drawbacks mentioned in the prior art and to manufacture in an economical and optimized manner an agglomerated zeolite material which comprises at least one mesoporous zeolite, the initial microporosity properties of which are maintained, i.e. the mesoporous zeolite used to prepare the said agglomerated material conserves all of its microporosity in the said material.

The agglomerated material has a high level of crystallinity and is endowed with a density and mechanical properties that are sufficient for use in dynamic or static adsorption or ion exchange processes.

Unless otherwise indicated in the present description, the proportions indicated are weight proportions, counted for the solid constituents as calcined equivalents, on the basis of calcinations performed at 950° C. for 1 hour.

The present invention relates to an agglomerated zeolite material comprising at least one mesoporous zeolite with an Si/Al atomic ratio which is strictly greater than 1.4 and less than or equal to 6, and optionally one or more non-mesoporous zeolites, the said material having at least the following characteristics:

a total zeolite content of at least 30%, preferably of at least 40%, more preferably of at least 70% by weight relative to the total weight of the agglomerate, a content of mesoporous zeolite(s) of greater than or equal to 30%, preferably greater than or equal to 40%, more preferably greater than or equal to 70%, even more preferentially greater than or equal to 80% and advantageously greater than or equal to 90%, a binder content expressed as anhydrous percentages, after calcinations performed at 950° C. for 1 hour, of less than or equal to 70%, preferably less than or equal to 60% and advantageously less than or equal to 30%, a mean volume diameter (D50), or a length (largest dimension when the material is not spherical) of less than or equal to 7 mm, preferably between 0.05 mm and 7 mm, more preferably between 0.2 mm and 5 mm and more preferentially between 0.2 mm and 2.5 mm, limits inclusive, and either a bulk crushing strength (BCS) measured according to standard ASTM 7084-04 of between 0.5 MPa and 6 MPa, preferably between 0.75 MPa and 4 MPa, for a material with a mean volume diameter (D50), or a length (largest dimension when the material is not spherical), of less than 1 mm, limits inclusive, or a grain crushing strength, measured according to standards ASTM D 4179 (2011) and ASTM D 6175 (2013), of between 0.5 daN and 30 daN, preferably between 1 daN and 20 daN, for a material with a mean volume diameter (D50), or a length (largest dimension when the material is not spherical), of greater than or equal to 1 mm, limits inclusive.

According to a preferred embodiment, the material of the present invention also has an apparent mass per unit volume of between 0.4 g·cm$^{-3}$ and 1 g·cm$^{-3}$, limits inclusive.

In the present invention, the agglomerates comprise at least one mesoporous zeolite of Faujasite (FAU) type, with an Si/Al atomic ratio which is strictly greater than 1.4 and less than or equal to 6, preferably of between 1.5 and 5, more preferably of between 1.5 and 3, limits inclusive, the said mesoporous zeolite advantageously being chosen from mesoporous zeolites of Y type. The said mesoporous zeolite is in the form of crystals with a mean numerical diameter, measured with a scanning electron microscope (SEM), of less than 20 μm, preferably between 0.1 μm and 20 μm, preferably between 0.1 and 10 μm, preferably between 0.5 μm and 10 μm and more preferably between 0.5 μm and 5 μm, limits inclusive.

In the present invention the term "mesoporous zeolite" means a zeolite with a mesoporous outer surface area, defined by the t-plot method described later, of between 40 m$^2$·g$^{-1}$ and 400 m$^2$·g$^{-1}$ and preferably between 60 m$^2$·g$^{-1}$ and 200 m$^2$·g$^{-1}$, limits inclusive. By extension, for the purposes of the present invention, a "non-mesoporous zeolite" is a zeolite optionally having a mesoporous outer surface area, defined by the t-plot method described later, strictly less than 40 m$^2$·g$^{-1}$.

The mesopores of the zeolite adsorbent according to the invention are easily identifiable by observation using a transmission electron microscope (TEM), as described, for example, in U.S. Pat. No. 7,785,563.

According to a preferred embodiment, the process according to the invention uses a zeolite adsorbent comprising mesoporous crystals of zeolite Faujasite (FAU) with an Si/Al atomic ratio which is strictly greater than 1.4 and less than or equal to 6, preferably of between 1.5 and 5, more preferably of between 1.5 and 3, limits inclusive, the said mesoporous zeolite advantageously being chosen from mesoporous zeolites of Y type. The term "mesoporous" means zeolite crystals (microporous) which have, in combination with the microporosity, internal cavities of nanometric size (mesoporosity), which are readily identifiable by observation using a transmission electron microscope (TEM), as described, for example, in U.S. Pat. No. 7,785,563.

As indicated in U.S. Pat. No. 7,785,563, observation by transmission electron microscopy (TEM) makes it possible to check whether the zeolite particles are solid zeolite crystals (i.e. non-mesoporous) or solid zeolite crystal aggregates or mesoporous crystals. Preferably, the adsorbents of the process according to the invention contain an amount of greater than equal to 30%, preferably greater than or equal to 40%, more preferably greater than or equal to 70%, more preferentially even more preferentially greater than or equal to 80% and advantageously greater than or equal to 90%, by number of mesoporous zeolite crystals and not solid crystals, relative to all of the crystals. This statistical analysis is advantageously performed by analysis of at least 50 TEM images.

The crystals of the mesoporous zeolite(s) included in the zeolite material of the invention, alone or as a mixture with other non-mesoporous zeolite crystals, are agglomerated with a binder. According to a preferred aspect of the invention, the binder content is as low as possible, so as to optimize the zeolite content of the zeolite material.

The binder included in the zeolite agglomerated material of the present invention comprises, and preferably consists of, a clay or a mixture of clays and/or of the silica or alumina sols which are then dried or gelled in order to make them set. These clays are preferably chosen from kaolins, kaolinites, nacrites, dickites, halloysites, attapulgites, sepiolites, montmorillonites, bentonites, illites and metakaolins, and also mixtures of two or more thereof in all proportions.

In the present invention, the term "binder" means an agglomeration binder which ensures the cohesion of the zeolite crystals in the agglomerated zeolite material of the invention. This binder is also distinguished from the zeolite crystals in that it does not have any zeolite crystalline structure after calcination, for which reason the binder is often referred to as being inert, and more precisely inert with respect to adsorption and/or ion exchange.

According to a particularly preferred aspect, the binder present in the agglomerated zeolite material of the invention consists solely of one or more clays, and preferably of only one clay.

The agglomerated zeolite material according to the present invention may also comprise one or more other components, in an amount of between 0 and 5%, preferably between 0 and 1% and more preferably between 0 and 0.5%, limits inclusive, the percentages being expressed on a weight basis relative to the total weight of the agglomerated zeolite material. This or these other component(s) are generally the residues of the additives, and other auxiliary agents for the synthesis of the said agglomerated zeolite material, and in particular those that will be described later in the present description.

Examples of such other components especially include ash of the additives after calcination, silica, and the like. It should be understood that these other components are generally present in the form of residues or traces and are not used to provide any binding or cohesive nature to the agglomerated zeolite materials comprising at least one mesoporous zeolite of the invention.

The agglomerated zeolite material of the present invention may be in various forms such as those that are well known to a person skilled in the art, who is a specialist in the agglomeration of powders or crystals, especially zeolite crystals, and, for example, and in a non-limiting manner, the agglomerated zeolite material of the invention may be in the form of beads, strands, extrudates or the like.

Moreover, it is observed that, in the case of zeolites in which the mesoporosity is obtained by post-treatment (for instance in US 2012/0258852), the micropore volume decreases greatly when the mesoporous outer surface area increases. On the other hand, in the case of the zeolites of the present invention, the mesoporosity is created during the synthesis of the crystals (direct synthesis) and it is observed that the micropore volume of the adsorbents remains substantially constant, even when the mesoporous outer surface area increases. This shows that the zeolite adsorbents according to the invention have, unlike the mesoporous zeolite adsorbents of the prior art, both a high mesoporous outer surface area and a high micropore volume.

According to another aspect, a subject of the present invention is also a process for preparing the agglomerated zeolite material described previously, comprising at least the steps of mixing at least one mesoporous zeolite, optionally with one or more additives, with at least one binder, in the proportions indicated previously, and shaping the agglomerated material, according to any method known to those skilled in the art, for example by extrusion, pelletizing, atomization or other agglomeration techniques that are well known to those skilled in the art.

According to a preferred embodiment, the process of the invention comprises at least the steps of:

a) agglomeration of crystals of at least one mesoporous zeolite with an Si/Al atomic ratio which is strictly greater than 1.4 and less than or equal to 6, with a number-average diameter of between 0.1 μm and 20 μm, preferably between 0.1 μm and 20 μm, preferably between 0.1 μm and 10 μm, more preferably between 0.5 μm and 10 μm and even more preferentially between 0.5 μm and 5 μm, and with a mesopore outer surface area, defined by the t-plot method described later, of between 40 $m^2 \cdot g^{-1}$ and 400 $m^2 \cdot g^{-1}$ and preferably between 60 $m^2 \cdot g^{-1}$ and 200 $m^2 \cdot g^{-1}$, limits inclusive, with a binder comprising at least 80% clay or a mixture of clays and/or of the silica or alumina sols which are then dried or gelled in order to make them set, the clay or clays being optionally zeolitizable, and with up to 5% of additives, and optionally one (or more) non-mesoporous zeolite(s), and also with the amount of water that allows the shaping of the agglomerated material;

b) drying of the agglomerates at a temperature of between 50° C. and 150° C.;

c) calcination of the agglomerates of step b) with flushing with an oxidizing and/or inert gas, especially with gases such as oxygen, nitrogen, air, a dry and/or decarbonated air, an oxygen-depleted air, which is optionally dry and/or decarbonated, at a temperature above 150° C., typically between 180° C. and 800° C. and preferentially between 200° C. and 650° C., for a few hours, for example from 2 to 6 hours;

d) optionally zeolitization of the binder by placing the agglomerates obtained in step c) in contact with an alkaline basic solution;

e) optionally cation exchange(s) of the agglomerates of step c) or of step d) by placing in contact with a solution of at least one alkali metal or alkaline-earth metal salt;

f) washing and drying of the agglomerates obtained in steps d) or e) under the conditions described in step b), and g) production of the agglomerated zeolite material by activation of the agglomerates obtained in step f) under the conditions described in step c).

It would not constitute a departure from the context of the invention if the at least one mesoporous zeolite used in the agglomeration step a) were to undergo beforehand one or more cation exchanges. In this case, step e) consequently becomes unnecessary.

According to a preferred mode of the invention, the powder (zeolite crystals) thus obtained is agglomerated in its existing form, after drying and/or after calcination and/or after ion exchange, by means of an inert binder for the purposes of the adsorption.

According to an entirely preferred embodiment of the process of the present invention, in step a) agglomeration of the zeolite crystals prepared is performed in the presence of a sacrificial template which is intended to be removed according to the methods known to those skilled in the art, for example by calcination, for the purpose of creating mesoporosity in the zeolite and thus obtaining a mesoporous zeolite.

The sacrificial template used may be of any type known to those skilled in the art and especially those described in patent application WO 2007/043 731. According to a preferred embodiment, the sacrificial template is advantageously chosen from organosilanes and more preferentially from [3-(trimethoxysilyl)propyl]octadecyldimethyl-ammonium chloride, [3-(trimethoxysilyl)propyl]hexadecyldimethylammonium chloride, [3-(trimethoxysilyl)propyl]dodecyldimethylammonium chloride, [3-(trimethoxysilyl)propyl]-octylammonium chloride, N-[3-(trimethoxysilyl)propyl]aniline, 3-[2-(2-aminoethylamino)-ethylamino]propyltrimethoxysilane, N-[3-(trimethoxysilyl)propyl]-N'-(4-vinylbenzyl)ethylene-diamine, triethoxy-3-(2-imidazolin-1-yl)propylsilane, 1-[3-(trimethoxysilyl)propyl] urea, N-[3-(trimethoxysilyl)propyl]ethylenediamine, [3-(diethylamino)propyl]trimethoxysilane, (3-glycidyloxypropyl)trimethoxysilane, 3-(trimethoxysilyl) propyl methacrylate, [2-(cyclo-hexenyl)ethyl]triethoxysilane, dodecyltriethoxysilane, hexadecyltrimethoxysilane, (3-aminopropyl)trimethoxysilane, (3-mercaptopropyl) trimethoxysilane, (3-chloropropyl)-trimethoxysilane, and also mixtures of two or more thereof in all proportions.

Among the sacrificial templates listed above, [3-(trimethoxysilyl)propyl]-octadecyldimethylammonium chloride, or TPOAC, is most particularly preferred.

Use may also be made of sacrificial templates of higher molar mass, for example PPDAs (Polymer PolyDiallyldimethylAmmonium), PVB (polyvinyl butyral) and other oligomeric compounds known in the field for increasing the diameter of mesopores.

The additional step of removing the sacrificial template may be performed at any moment during the process for preparing the agglomerated zeolite material of the invention. The removal of the said sacrificial template may thus be advantageously performed by calcination of the zeolite crystals before the agglomeration step a), or alternatively concomitantly with step c).

It would not constitute a departure from the context of the invention if the zeolite(s) before agglomeration were to undergo one or more successive exchanges with alkaline metal or alkaline-earth metal salts.

The dried crystals are then subjected to calcination, this step being necessary to release both the microporosity (removal of water) and the mesoporosity (removal of the structuring agent). In addition, calcination makes it possible to remove the sacrificial template. This calcination step may be performed according to any calcination method known to those skilled in the art, for example, in a non-limiting manner, the calcination of zeolite crystals comprising the sacrificial template may be performed under a flush of oxidizing and/or inert gas, especially with gases such as oxygen, nitrogen, air, a dry and/or decarbonated air, an oxygen-depleted air, which is optionally dry and/or decarbonated, at one or more temperatures above 150° C., typically between 180° C. and 800° C. and preferentially between 200° C. and 650° C., for a few hours, for example between 2 and 6 hours. The nature of the gases, the temperature increase ramps and the successive temperature steady stages and the durations thereof will be adapted as a function of the nature of the sacrificial template.

The size of the mesoporous zeolite crystals used in step a) and of the mesoporous zeolite crystals in the agglomerates is measured by observation with a scanning electron microscope (SEM). This SEM observation also makes it possible to confirm the presence of a non-zeolite phase comprising, for example, residual binder (not converted during the zeolitization step) or any other amorphous phase in the agglomerates. In the description of the present invention, the term "numerical mean diameter" or "size" is used for the zeolite crystals. The method for measuring these magnitudes is explained later in the description.

The agglomeration and shaping (step a) may be performed according to any technique known to those skilled in the art, such as extrusion, compacting, agglomeration on a granulating plate, a granulating drum, atomization and the like. The proportions of agglomeration binder and of zeolites used are between 5 parts and 70 parts by weight of binder per 95 parts to 30 parts by weight of zeolite. The agglomerates used in step a), whether they are in the form of beads, extrudates or the like, generally have a number-average volume diameter, or a length (largest dimension when they are not spherical), of less than or equal to 7 mm, preferably between 0.05 mm and 7 mm, more preferably between 0.2 mm and 5 mm and more preferentially between 0.2 mm and 2.5 mm.

During step a), besides the zeolite crystal(s) and the binder, one or more additives may also be added. The additives are preferentially organic, for example lignin, starch, carboxymethylcellulose, surfactant (cationic, anionic, non-ionic or amphoteric) molecules, intended to facilitate the handling of the zeolite/clay pulp by modification of the rheology and/or the bonding power or to give the final agglomerates satisfactory properties, especially in terms of macroporosity. Mention may preferentially be made, but not exhaustively, of methylcelluloses and derivatives thereof, lignosulfonates, polycarboxylic acids and carboxylic acid copolymers, amino derivatives thereof and salts thereof, especially alkali metal salts and ammonium salts. The additives are introduced in a proportion of from 0 to 5% and preferably from 0.1% to 2%.

The additives may also be a source of liquid and/or solid silica, preferably representing from 1% to 5% of the total mass of the said solids. The optional source of silica may be of any type known to a person skilled in the art, who is a specialist in the synthesis of zeolites, for example colloidal silica, diatomaceous earths, perlite, flyash, sand or any other form of solid silica.

During the calcination step c), the nature of the gases, the temperature increase ramps and the successive temperature steady stages, and also the respective durations thereof, will be adapted as a function of the nature of the sacrificial template to be removed and as a function of the nature of the binder used in the agglomeration step a).

During the optional step d), the zeolitization of the agglomeration binder is performed according to any method that is now well known to those skilled in the art and may be performed, for example, by immersing the product of step c) in an alkaline basic solution, which is generally aqueous, for example an aqueous sodium hydroxide and/or potassium hydroxide solution.

The agglomerated zeolite materials according to the present invention have both the characteristics of mesoporous zeolites, but also especially the mechanical properties of the conventional agglomerated zeolites known from the prior art, i.e. without any mesoporous zeolite.

More particularly, the agglomerated zeolite materials of the invention show that it is possible to maintain the crystallinity and the mesoporosity of zeolite within an agglomerated zeolite material, to obtain an undegraded and mechanically strong agglomerated zeolite material. In addition, the process for preparing the agglomerated zeolite materials with mesoporous zeolite(s) according to the invention is a process that is easy, rapid and economical to implement and thus readily industrializable with a minimum of steps.

The examples that follow illustrate the subject of the invention, and are given purely as a guide, without, however, being intended to limit the various embodiments of the present invention in any way.

In the examples that follow, the physical properties of the agglomerates are evaluated by the methods known to those skilled in the art, the main ones of which are recalled hereinbelow.

Loss on Ignition of the Samples (Zeolite Adsorbents):

The loss on ignition is determined in an oxidizing atmosphere, by calcination of the sample in air at a temperature of 950° C.±25° C., as described in standard NF EN 196-2 (April 2006). The measurement standard deviation is less than 0.1%.

Measurement of the Purity:

The purity of the zeolite phases in the agglomerates is evaluated by X-ray scattering analysis, which is known to those skilled in the art by the abbreviation XRD. This identification is performed on an XRD machine of Brüker.

This analysis makes it possible to identify the crystalline phases present in the analysed solid since each of the zeolite structures has a unique diffraction spectrum (or diffractogram) defined by the position of the diffraction peaks and by their relative intensities.

The agglomerated zeolite materials are ground and then spread out and smoothed on a sample holder by simple mechanical compression.

The conditions for the acquisition of the diffraction spectrum (or diffractogram) performed on the Brüker D5000 machine are as follows:

Cu tube used at 40 kV-30 mA;
Slit size (divergent, diffusion and analysis)=0.6 mm;
filter: Ni;
rotating sample device: 15 rpm;
measuring range: $3°<2\theta<50°$;
increment: 0.02°;
counting time per increment: 2 seconds.

Interpretation of the diffraction spectrum (or diffractogram) obtained is performed under EVA with identification of the phases using the base ICCD PDF-2 release 2011.

The amount of the zeolite X fractions is measured by XRD analysis. This analysis is performed on a Brüker brand machine, and the amount of zeolite X fractions is then evaluated using the TOPAS software from the company Brüker.

Qualitative and Quantitative Analysis by X-Ray Diffraction

This analysis makes it possible to identify the crystalline phases present in the analysed solid since each of the zeolite structures has a unique diffractogram (or diffraction spectrum) defined by the position of the diffraction peaks and by their relative intensities.

The agglomerated zeolite materials are ground and then spread out and smoothed on a sample holder by simple mechanical compression. The acquisition conditions for the diffractogram performed on the D5000 Brüker machine are as follows:

Cu tube used at 40 kV-30 mA;
slit size (divergent, scattering and analysis)=0.6 mm;
filter: Ni;
rotating sample device: 15 rpm;
measurement range: $3°<2\theta<50°$;
increment: 0.02°;
counting time per increment: 2 seconds.

The interpretation of the diffraction spectrum (or diffractogram) obtained is performed with the EVA software with identification of the phases using the base ICDD PDF-2, release 2011, which makes it possible to demonstrate a perfectly crystalline phase.

The quantity of the zeolite fractions by weight is measured by XRD analysis: this method is also used for measuring the amount of zeolite FAU fractions. This analysis is performed on a Brüker machine, and the weight amount of zeolite fractions is then evaluated by means of the TOPAS software from the company Brüker.

Measurement of the Micropore Volume:

The measurement of the micropore volume is estimated via standard methods such as measurement of the Dubinin-Raduskevitch volumes (adsorption of liquid nitrogen at 77 K).

The Dubinin-Raduskevitch volume is determined from the measurement of the isotherm of adsorption of nitrogen gas at its liquefaction temperature. Prior to the adsorption, the zeolite adsorbent is degassed at between 300° C. and 450° C. for a time of between 9 hours and 16 hours, under vacuum ($P<6.7\times10^{-4}$ Pa). The measurement of the adsorption isotherms is then performed on a machine of ASAP 2020 type from Micromeritics, taking at least 35 measurement points at P/P0 relative ratio pressures of between 0.002 and 1. The micropore volume is determined according to Dubinin and Raduskevitch from the isotherm obtained, by applying standard ISO 15901-3 (2007). The micropore volume evaluated according to the Dubinin-Raduskevitch equation is expressed in cm³ of liquid adsorbate per gram of zeolite. The measurement uncertainty is $±0.003$ cm³·g⁻¹.

Measurement of the Mesopore Outer Surface Area ($m^2 \cdot g^{-1}$) via the t-Plot Method:

The t-plot calculation method exploits the data of the adsorption isotherm Q ads=f (P/P0) and makes it possible to calculate the micropore surface area. The outer surface area may be deduced therefrom by determining the difference with the BET surface area which calculates the total pore surface area in m²·g⁻¹ (BET S=micropore surface area+ mesopore outer surface area).

To calculate the micropore surface area via the t-plot method, the curve Q ads (cm³·g⁻¹) is plotted as a function of t=thickness of the layer dependent on the partial pressure P/P0 which would be formed on a reference non-porous solid (t function of log (P/P0): Harkins-Jura equation applied: [13.99/(0.034−log(P/P0))^0.5]. In the interval t between 0.35 nm and 0.5 nm, a straight line may be plotted which defines a y-axis at the origin Q adsorbed which makes it possible to calculate the micropore surface area. If the solid is not microporous, the straight line passes through 0.

Observation of the Mesopore Structure by Transmission Electron Microscopy

After grinding the adsorbents with a mortar, the powder obtained is dispersed in ethanol for 1 minute with ultrasonication. One drop of the solution is placed on a microscope grate. The sample is left to dry under the ambient conditions.

Figure 2:
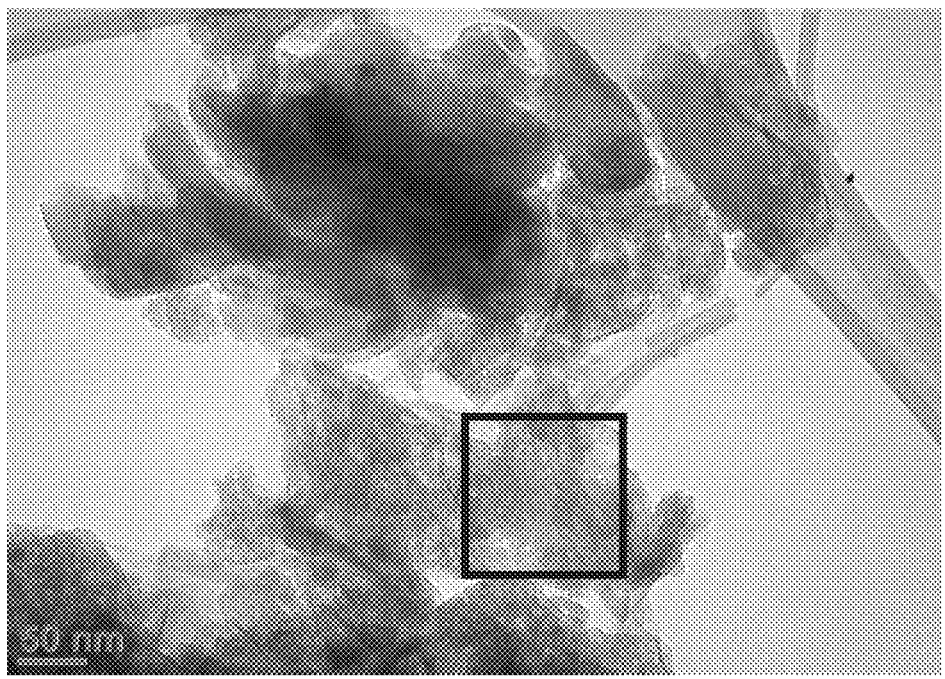
FIG. 2: TEM image obtained at a magnification of x175 000 of the adsorbent according to the invention.

The observation is performed with a transmission electron microscope (CM 200 from FEI) at a voltage of 120 kV. FIGS. 1 and 2 show TEM images obtained at a magnification of ×245 000 and ×175 000, respectively, of a reference adsorbent (FIG. 1) and of the adsorbent according to the invention (FIG. 2). The image of FIG. 2 makes it possible to visualize (cf. for example the box in FIG. 2) the presence of the mesopores and to estimate their diameters.

Particle Size of the Crystals:

The estimation of the number-average diameter of the mesoporous zeolite crystals used in step a) and of the zeolite crystals contained in the agglomerates is performed as indicated previously by observation with a scanning electron microscope (SEM).

In order to estimate the size of the zeolite crystals on the samples, a set of images is taken at a magnification of at least 5000. The diameter of at least 200 crystals is then measured using dedicated software, for example the Smile View software from the editor LoGraMi. The accuracy is about 3%.

Bulk Crushing Strength:

The crushing strength of a bed of zeolite adsorbents as described in the present invention is characterized according to the Shell method series SMS1471-74 (Shell Method Series SMS1471-74 "Determination of Bulk Crushing Strength of Catalysts. Compression-Sieve Method"), combined with the "BCS Tester" machine sold by the company Vinci Technologies. This method, originally intended for characterizing catalysts between 3 mm and 6 mm in size, is based on the use of a 425 μm screen which makes it possible especially to separate the fines created during the crushing. The use of a 425 μm screen remains suitable for particles with a diameter of greater than 1.6 mm, but must be adapted according to the particle size of the agglomerates that it is desired to characterize.

Grain Crushing Strength:

The mechanical grain crushing strengths are determined using a Grain Crushing Strength machine sold by Vinci Technologies, according to standards ASTM D 4179 and D 6175.

Measurement of the Si/Al Atomic Ratio:

The agglomerated zeolite material of the invention was evaluated as regards the Si/Al atomic ratio by elemental chemical analysis of the said agglomerated zeolite material, and more precisely by X-ray fluorescence chemical analysis as described in standard NF EN ISO 12677 (2011) on a wavelength dispersive spectrometer (WDXRF), for example the Tiger S8 machine from the company Brüker. The X-ray fluorescence spectrum has the advantage of being very little dependent on the chemical combination of the element, which offers precise determination, both quantitatively and qualitatively.

A measurement uncertainty of less than 0.4% by weight is conventionally obtained after calibration for each oxide, inter alia for $SiO_2$ and $Al_2O_3$. The measurement uncertainty of the Si/Al atomic ratio is ±5%.

Example 1: Synthesis of HPY with Addition of Nucleation Gel and of Growth Gel with a $TPOAC/Al_2O_3$ ratio=0.04 a) Preparation of the Growth Gel in a Stirred Reactor with an Archimedean Screw at 300 rpm.

A growth gel is prepared in a 3-liter stainless-steel reactor equipped with a heating jacket, a temperature probe and a stirrer, by adding 1446 g of colloidal silica (Ludox AM-30 containing 30% by weight of $SiO_2$) at 25° C. to an aluminate solution containing 184 g of sodium hydroxide (NaOH), 138 g of alumina trihydrate ($Al_2O_3$ 3$H_2O$, containing 65.2% by weight of $Al_2O_3$) and 800 g of water at 25° C. for 25 minutes with a stirring speed of 300 rpm.

The stoichiometry of the growth gel is as follows: 2.5 $Na_2O/Al_2O_3$/8.0 $SiO_2$/117 $H_2O$. Homogenization of the growth gel is performed with stirring at 300 rpm for 25 minutes at 25° C.

b) Addition of the Nucleation Gel 61.2 g of nucleation gel (i.e. 2% by weight) of composition 12 $Na_2O/Al_2O_3$/10 $SiO_2$/180 $H_2O$ prepared by mixing a sodium silicate with a sodium aluminate, with stirring, for 1 hour with stirring at 40° C., are added to the growth gel at 25° C. with stirring at 300 rpm. After homogenization for 5 minutes at 300 rpm, the stirring speed is reduced to 100 rpm and stirring is continued for 30 minutes.

c) Introduction of the Structuring Agent into the Reaction Medium 27.3 g of a 60% solution of TPOAC in methanol (MeOH) are introduced into the reaction medium with a stirring speed of 300 rpm ($TPOAC/Al_2O_3$ mole ratio=0.04). A maturation step is performed at 25° C. for 1 hour at 300 rpm before starting the crystallization.

d) Crystallization

The stirring speed is lowered to 50 rpm and the nominal temperature of the reactor jacket is set at 80° C. so that the temperature of the reaction medium rises to 75° C. over 80 minutes. After a steady stage at 75° C. for 22 hours, the reaction medium is cooled by circulating cold water through the jacket to stop the crystallization.

e) Filtration/Washing

The solids are recovered on a sinter and then washed with deionized water to neutral pH.

f) Drying/Calcination

In order to characterize the product, drying is performed in an oven at 90° C. for 8 hours, and the loss on ignition of the dried product is 23% by weight.

The calcination of the dried product necessary to release both the microporosity (water) and the mesoporosity by removing the structuring agent is performed with the following temperature profile: 30 minutes of temperature increase to 200° C., then 1 hour at a steady stage of 200° C., then 3 hours of temperature increase to 550° C., and finally 1.5 hours of steady stage at 550° C.

A pure mesoporous zeolite Y (identification by X-ray diffraction spectrum) with an Si/Al ratio determined by X-ray fluorescence equal to 2.6 and with a micropore volume equal to 0.330 cm³·g⁻¹ is thus obtained.

For comparative purposes for the preparation of an agglomerated zeolite material, a non-mesoporous commercial zeolite, CBV100 sold by Zeolyst International, with an Si/Al atomic ratio equal to 2.6 is used.

The characteristics of the mesoporous zeolite Y (HPY) prepared in this Example 1 and the characteristics of the reference zeolite indicated above are collated in Table 1 below:

TABLE 1

|  |  | Reference | Reference non-mesoporous zeolite Y | Mesoporous zeolite Y (Example 1) |
|---|---|---|---|---|
| Synthesis | TPOAC/Al$_2$O$_3$ mole ratio | | — | 0.04 |
| | Synthesis time (h) | | — | 26 |
| Nitrogen adsorption isotherm at 77 K | Micropore volume (cm$^3 \cdot$ g$^{-1}$) | | 0.328 | 0.330 |
| | Mesopore outer surface area (m$^2 \cdot$ g$^{-1}$) | | 20 | 100 |
| | Mesopore size (nm) | | — | 5 to 10 |
| XRD spectrum or diffractogram | Crystalline phase | | FAU | FAU |
| | Crystallinity (%) | | 100 | 100 |

The size distribution of the mesopores is characterized by the Density Functional Theory (DFT) method with the cylindrical pore model. The percentage of crystallinity is calculated by means of the TOPAS software using the base ICDD PDF-2, release 2011.

Example 2: Preparation of Mesoporous Zeolite HPY Agglomerates (According to the Invention)

In the text hereinbelow, a mass expressed as anhydrous equivalent means a product mass which has been decreased by its loss on ignition.

A homogeneous mixture consisting of 1600 g anhydrous equivalent of mesoporous zeolite Y crystals obtained in Example 1, 350 g anhydrous equivalent of kaolin, 130 g of colloidal silica sold under the trade name Klebosol® 30 (containing 30% by weight of SiO$_2$ and 0.5% of Na$_2$O) and also an amount of water which allows extrusion of the mixture, is prepared. The loss on ignition of the pulp before extrusion is 44%.

Extrudates 1.6 mm in diameter are formed. The extrudates are dried overnight in a ventilated oven at 80° C. They are then calcined for 2 hours at 550° C. under a flush of nitrogen, and then for 2 hours at 550° C. under a flush of dry decarbonated air.

The mechanical grain crushing strength of the mesoporous zeolite Y extrudates is 2.7 daN. Their apparent mass per unit volume is 0.63 g·cm$^{-3}$.

Example 3: Preparation of Non-Mesoporous Zeolite Y Agglomerates (Comparative Example)

The operations of Example 2 are repeated in an identical manner, replacing the mesoporous zeolite Y with the reference non-mesoporous zeolite Y (CBV 100). The mechanical grain crushing strength of the reference non-mesoporous zeolite Y extrudates is 1.7 daN. Their apparent mass per unit volume is 0.60 g·cm$^{-3}$.

It is thus observed that the agglomerated zeolite material according to the invention comprising a mesoporous zeolite Y has mechanical properties and an apparent density that are comparable to those of an agglomerated zeolite material comprising a non-mesoporous zeolite.

It is thus entirely noteworthy that the present invention provides agglomerated zeolite materials combining both the properties of mesoporous zeolites, the properties associated with the microporosity and the mechanical properties of the zeolite agglomerates known hitherto. It is thus possible to envisage without problem the use of the agglomerated zeolite materials of the invention in all fields of industrial application such as catalysis, separation, adsorption and the like.

Example 4: Comparison of the Agglomerates of Examples 2 and 3

The results of the comparative analysis are presented in Table 2 below:

TABLE 2

| | Nitrogen adsorption isotherm at 77 K | | XRD spectrum | |
|---|---|---|---|---|
| Agglomerate | Micropore volume (cm$^3 \cdot$ g$^{-1}$) | Mesopore outer surface area (m$^2 \cdot$ g$^{-1}$) | Crystalline phase | Crystallinity (%) |
| Example 2 (according to the invention) | 0.260 | 80 | FAU | 100% |
| Example 3 (comparative) | 0.250 | 15 | FAU | 100% |

The agglomerates according to the invention have micropore volumes that are equivalent to those measured on agglomerates based on non-mesoporos zeolites of the prior art and mesopore outer surface areas that are markedly greater than those measured on these same agglomerates based on non-mesoporous zeolites of the prior art.

The invention claimed is:

1. An agglomerated zeolite material comprising at least one mesoporous zeolite, wherein:
   (1) the mesoporous zeolite has an Si/Al atomic ratio of greater than 1.4 and less than or equal to 6,
   (2) the agglomerated zeolite material has a total zeolite content of at least 30% by weight relative to the total weight of the agglomerated zeolite material,
   (3) the agglomerated zeolite material has a content of mesoporous zeolite of greater than or equal to 30% by weight relative to the total weight of the agglomerated zeolite material,
   (4) the agglomerated zeolite material has a binder content, after calcinations performed at 950° C. for 1 hour, of less than or equal to 70% by weight relative to the total weight of the agglomerated zeolite material,
   (5) the agglomerated zeolite material has a mean volume diameter (D50), or a length (largest dimension when the agglomerated zeolite material is not spherical) of less than 7 mm, and
either
   (a) the agglomerated zeolite material has a bulk crushing strength (BCS) measured according to standard ASTM 7084-04 of between 0.5 MPa and 6 MPa for an agglomerated zeolite material with a mean volume diameter (D50), or a length (largest dimension when the agglomerated zeolite material is not spherical), of less than 1 mm, limits inclusive, or
   (b) the agglomerated zeolite material has a grain crushing strength, measured according to standards ASTM D 4179 (2011) and ASTM D 6175 (2013), of 0.5 daN to 30 daN for an agglomerated zeolite material with a mean volume diameter (D50), or a length (largest dimension when the agglomerated zeolite material is not spherical), of greater than or equal to 1 mm, limits inclusive, wherein the mesoporous zeolite has a mesoporous outer surface area of between 40 m$^2 \cdot$g$^{-1}$ and 400 m$^2 \cdot$g$^{-1}$ as defined by the t-plot method.

2. The agglomerated zeolite material of claim 1, further comprising one or more non-mesoporous zeolites.

3. The agglomerated zeolite material of claim 1, which has an apparent mass per unit volume of 0.4 g·cm$^{-3}$ to 1 g·cm$^{-3}$.

4. The agglomerated zeolite material of claim 1, wherein the mesoporous zeolite has an Si/Al atomic ratio of 1.5 to 5.

5. The agglomerated zeolite material of claim 1, in which the zeolite crystals are agglomerated with a binder comprising a clay or a mixture of clays selected from the group consisting of kaolins, kaolinites, nacrites, dickites, halloysites, attapulgites, sepiolites, montmorillonites, bentonites, illites, metakaolins, mixtures thereof, and the silica or alumina sols thereof.

6. The agglomerated zeolite material of claim 1, which has both the characteristics of mesoporous zeolites, but also the mechanical properties of conventional zeolite agglomerates in which the zeolite is non-mesoporous.

7. The agglomerated zeolite material of claim 1, wherein the total zeolite content is at least 70% by weight relative to the total weight of the agglomerated zeolite material.

8. The agglomerated zeolite material of claim 1, wherein the content of mesoporous zeolite is greater than or equal to 90% relative to the total weight of the agglomerated zeolite material.

9. The agglomerated zeolite material of claim 1, wherein the binder content, after calcinations performed at 950° C. for 1 hour, is less than or equal to 30% relative to the total weight of the agglomerated zeolite material.

10. The agglomerated zeolite material of claim 1, wherein the mean volume diameter (D50), or a length (largest dimension when the agglomerated zeolite material is not spherical), is 1 mm to 2.5 mm.

11. The agglomerated zeolite material of claim 1, the mesoporous zeolite has an Si/Al atomic ratio of 1.5 to 3.

12. The agglomerated zeolite material of claim 1, wherein the mesoporous zeolite is a Y-type FAU zeolite.

13. The agglomerated zeolite material of claim 1, wherein the mesoporous zeolite is in the form of crystals having a mean numerical diameter of less than 20 µm as measured with a scanning electron microscope.

14. The agglomerated zeolite material of claim 1, which has a grain crushing strength, measured according to standards ASTM D 4179 (2011) and ASTM D 6175 (2013), of between 1 daN and 20 daN.

15. The agglomerated zeolite material of claim 1, wherein the binder content, after calcinations performed at 950° C. for 1 hour, is less than or equal to 60% relative to the total weight of the agglomerated zeolite material.

16. The agglomerated zeolite material of claim 1, wherein the mesoporous zeolite has an Si/Al atomic ratio of greater than 1.4 to 3.

17. The agglomerated zeolite material of claim 1, wherein (a) the agglomerated zeolite material has a mean volume diameter (D50), or a length (largest dimension when the agglomerated zeolite material is not spherical) of 1 mm to 7 mm.

18. The agglomerated zeolite material of claim 1, wherein the mesoporous zeolite has a mesoporous outer surface area of between 60 m$^2 \cdot$g$^{-1}$ and 200 m$^2 \cdot$g$^{-1}$ as defined by the t-plot method.

19. The agglomerated zeolite material of claim 1, which (a) has a bulk crushing strength (BCS) measured according to standard ASTM 7084-04 of between 0.5 MPa and 6 MPa for an agglomerated zeolite material with a mean volume diameter (D50), or a length (largest dimension when the agglomerated zeolite material is not spherical), of less than 1 mm, limits inclusive.

20. The agglomerated zeolite material of claim 1, which (b) has a grain crushing strength, measured according to standards ASTM D 4179 (2011) and ASTM D 6175 (2013), of 0.5 daN to 30 daN for an agglomerated zeolite material with a mean volume diameter (D50), or a length (largest dimension when the agglomerated zeolite material is not spherical), of greater than or equal to 1 mm, limits inclusive.

21. A process for preparing the agglomerated zeolite material of claim 1, comprising:
   a) forming an agglomerated material by agglomerating crystals of at least one mesoporous zeolite with an Si/Al atomic ratio which is greater than 1.4 and less than or equal to 6, with a number-average diameter of 0.1 µm to 20 µm and with a mesopore outer surface area of 40 m$^2 \cdot$g$^{-1}$ to 400 m$^2 \cdot$g$^{-1}$, with a binder comprising at least 80% clay or a mixture of clays and/or of the silica or alumina sols which are then dried or gelled in order to make them set, the clay or clays being optionally zeolitizable, and with up to 5% of additives, and optionally at least one non-mesoporous zeolite, and with an amount of water that allows the shaping of the agglomerated material;
   b) drying the agglomerated material from a) at a temperature of between 50° C. and 150° C. to obtain dried agglomerates;
   c) calcining the dried agglomerates from b) with flushing with an oxidizing and/or inert gas, which is optionally dried and/or decarbonated, at a temperature above 150° C.;
   d) optionally zeolitizing the binder by placing the calcined agglomerates obtained in c) in contact with an alkaline basic solution;
   e) optionally cation exchanging the agglomerates from c) or d) by placing the agglomerates in contact with a solution of at least one alkali metal or alkaline-earth metal salt;
   f) washing and drying the agglomerates obtained in d) or e) at a temperature of between 50° C. and 150° C., and
   g) producing the agglomerated zeolite material by activating the agglomerates obtained in f) under the conditions described in c).

22. The process of claim 21, wherein, in a), agglomeration of crystals of a zeolite prepared in the presence of a sacrificial template is performed.

23. The process of claim 22, wherein the sacrificial template is selected from the group consisting of organosilane compounds and oligomers.

24. The process of claim 23, wherein removal of the sacrificial template is performed by calcination of the zeolite crystals before the agglomeration a), or concomitantly with c).

* * * * *